United States Patent [19]

Maslanka

[11] Patent Number: 4,515,657
[45] Date of Patent: May 7, 1985

[54] WET STRENGTH RESINS

[75] Inventor: William W. Maslanka, London-Britain Township, Chester County, Pa.

[73] Assignee: Hercules Incorporated, Wilmington, Del.

[21] Appl. No.: 627,258

[22] Filed: Jul. 2, 1984

Related U.S. Application Data

[62] Division of Ser. No. 488,893, Apr. 27, 1983, Pat. No. 4,487,884.

[51] Int. Cl.$^3$ .............................................. D21H 3/48
[52] U.S. Cl. ................................ 162/164.3; 162/164.6
[58] Field of Search ........................... 162/164.3, 164.6

[56] References Cited

U.S. PATENT DOCUMENTS

| | | | |
|---|---|---|---|
| 2,926,154 | 2/1960 | Keim | 260/29.2 |
| 3,311,594 | 3/1967 | Earle, Jr. | 260/77.5 |
| 3,793,279 | 2/1974 | Lipowski | 260/29.2 |
| 3,887,510 | 6/1975 | Chan et al. | 260/29.2 N |
| 3,891,589 | 6/1975 | Ray-Chaudhuri | 260/29.2 EP |
| 4,388,439 | 6/1983 | Maslanka | 524/845 |

FOREIGN PATENT DOCUMENTS 865727 4/1961 United Kingdom .

Primary Examiner—William Smith
Attorney, Agent, or Firm—Hazel L. Deming

[57] ABSTRACT

Disclosed are novel wet strength resins for paper. The resins are produced by reacting an epihalohydrin, such as epichlorohydrin, with a polyaminopolyamide derived by reacting methylbisaminopropylamine with oxalic acid or mixture containing oxalic acid and one or more different saturated dicarboxylic acids or their esters.

4 Claims, No Drawings

WET STRENGTH RESINS

This application is a division of application Ser. No. 488,893, filed Apr. 27, 1983, now U.S. Pat. No. 487,884.

This invention relates to the synthesis of wet and dry strength resins for use in the manufacture of paper, the broke of which can be easily and readily repulped.

Broke is a waste product of the paper industry which, if not recovered and utilized, represents a substantial loss. It is customary to repulp the broke and reuse it in the paper-making process. Wet strength broke is difficult to repulp and the repulping of wet strength broke is discussed by Schmalz in Tappi, Vol. 44, pages 275–280 (April 1961).

Cationic, water-soluble, thermosetting resins derived by the reaction of aminopolyamides with epichlorohydrin are known wet strength resins for paper. Typical of these wet strength resins are the resins of U.S. Pat. No. 2,926,154 to Keim derived by the reaction of epichlorohydrin and an aminopolyamide produced from a polyalkylene polyamine and a $C_3$ to $C_8$ saturated aliphatic dicarboxylic acid such as glutaric acid, adipic acid and the like. British Pat. No. 865,727 to Hercules Powder Co. and U.S. Pat. No. 3,311,594 to Earle, Jr. also disclose resins derived by reaction of epichlorohydrin and an aminopolyamide derived from a $C_3$ to $C_{10}$ saturated dicarboxylic acid and N-bis(aminopropyl)-methylamine, also known as methylbisaminopropylamine. See also U.S. Pat. No. 3,793,279 to Lipowski, U.S. Pat. No. 3,887,510 to Chan et al and U.S. Pat. No. 3,891,589 to Ray-Chaudhuri which disclose the use of diesters derived from $C_2$ to $C_{20}$ saturated dicarboxylic acids in the preparation of aminopolyamides which are subsequently reacted with epichlorohydrin. Further, in U.S. Pat. No. 3,793,279 Lipowski teaches producing cationic wet strength resins by reacting certain chain-extended, amine-terminated base polyamides with epichlorohydrin and discloses that the brokes from papers which are treated with these resins are more easily recovered than brokes from paper treated with other wet strength resins such as those disclosed in U.S. Pat. No. 2,926,154 to Keim. Lipowski also indicates that acids which decarboxylate such as oxalic acid are not suitable for making wet strength resins and shows that the products prepared from diethylenetriamine and oxalic acid, with or without subsequent amine termination and chain extension do not, upon reaction with epichlorohydrin, provide cationic resins having wet strength properties.

Now in accordance with this invention it has been found that the resins prepared by reacting an epihalohydrin, such as epichlorohydrin, with a polyaminopolyamide derived by the reaction of oxalic acid with methylbisaminopropylamine impart good wet strength to paper and the paper can be repulped using relatively mild repulping conditions. Accordingly the present invention relates to a process for preparing an aqueous solution of a water-soluble, cationic thermosetting resin which process comprises reacting methylbisaminopropylamine with a saturated dicarboxylic acid component of which at least 20 mole % is oxalic acid to form a polyaminopolyamide containing tertiary amine groups, the mole ratio of methylbisaminopropylamine to the acid component being from about 0.9:1 to about 1.2:1, and then reacting the polyaminopolyamide in aqueous solution with from about 1 mole to about 1.5 moles of an epihalohydrin per mole of tertiary amine groups present in said polyaminopolyamide.

In the preparation of the resins of this invention a saturated dicarboxylic acid component containing oxalic acid is first reacted wih methylbisaminopropylamine to produce a long chain polyaminopolyamide. Oxalic acid can make up the entire dicarboxylic acid component or a portion of the oxalic acid up to about 80 mole % can be replaced with one or more saturated dicarboxylic acids containing at least 4 carbon atoms and preferably 4 to 8 carbon atoms, or their esters. Particularly preferred are adipic and glutaric acid and the diesters derived from these acids and $C_1$–$C_3$ saturated aliphatic monohydric alcohols such as methanol, ethanol, propanol, and isopropanol. Specific examples of the preferred diesters are dimethyl adipate, diethyl adipate, dipropyl adipate, dimethyl glutarate, diethyl glutarate and dipropyl glutarate. The methylbisaminopropylamine reactant, also referred to in the art as N-bis(aminopropyl)methylamine, has the formula

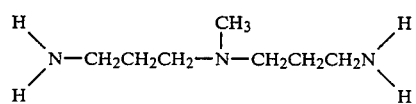

The polyaminopolyamide is then reacted in aqueous solution with an epihalohydrin to form a water-soluble cationic thermosetting resin.

Reaction of the dicarboxylic acid component containing oxalic acid with the amine is preferably carried out neat but can also be carried out in a solution or dispersion of the reactants in a suitable solvent such as water, alcohols and the like. Usually, when the entire dicarboxylic acid component is oxalic acid, the acid is added gradually to the amine over a period of time sufficient to maintain the temperature at below about 150° C. and prevent decomposition of the acid prior to reaction with the amine and then the temperature is raised to about 150° C. to about 200° C. and maintained thereat for a length of time sufficient to remove the water of polycondensation and produce a polyamide having an intrinsic viscosity of at least about 0.06. When the acid component also contains different dicarboxylic acids or esters, the oxalic acid and the different acids or esters are usually added separately to the amine and the preferred procedure involves first adding the oxalic acid to the amine while maintaining the temperature at below about 150° C. and then reacting the oxalic acid with the amine prior to adding the other dicarboxylic acid(s) or ester(s) and completing the reaction. Temperatures employed in the reaction can vary between about 150° C. and about 200° C. Preferred temperature range is about 160° C. to about 190° C. Time of reaction depends on temperature and is inversely proportional thereto. Usually the reaction time will vary from about ½ to two hours.

In carrying out the reaction, it is preferred to use an amount of the dicarboxylic acid component sufficient to react substantially completely with the primary amine groups of the methylbisaminopropylamine. This will usually require a mole ratio of amine to acid component of from about 0.9:1 to about 1.2:1. The preferred mole ratio is about 1:1.

In converting the polyaminopolyamide to a water-soluble cationic thermosetting resin, the polyaminopolyamide is reacted in aqueous solution with an epihalohydrin, preferably epichlorohydrin. The reaction is carried out in solution, using the polyaminopolyamide in the form of its water soluble acid salt in those cases where the free amine form of the polyaminopolyamide has limited water solubility. Usually the reaction is carried out at a temperature from about 40° C. to about 100° C. and preferably from about 45° C. to 85° C. until the viscosity of a 25% solids solution at 25° C. has reached about E-F or higher on the Gardner-Holdt scale or the Spence-Spurlin viscosity is at least about 20 and preferably ranges from about 22 to about 30 seconds.

The acid salt of the polyaminopolyamide is easily and readily prepared by adding to an aqueous dispersion of the polyaminopolyamide a water-soluble acid such as hydrochloric acid in an amount essentially stoichiometrically equivalent to the tertiary amines of the polyaminopolyamide whereby essentially all the tertiary amines are converted to the acid salt. Suitable acids for salt formation are water-soluble, are within the skill of the art and include inorganic acids such as sulfuric acid, hydrochloric acid, nitric acid and phosphoric acid and organic acids such as acetic acid.

In the polyaminopolyamide-epihalohydrin reaction, it is preferred to use sufficient epihalohydrin to convert all tertiary amine groups to quaternary ammonium groups. Satisfactory resins can be prepared by using from about 1 mole to about 1.5 moles and preferably from about 1.2 to about 1.4 moles of epihalohydrin per mole of tertiary amine of the polyaminopolyamide. pH adjustment is usually not necessary during reaction. However, since the pH decreases during the reaction it may be desirable in some cases to add alkali to combine with at least some of the acid formed. When the desired viscosity is reached, sufficient additional water is added to adjust the solids content of the resin solution to about 15% or less and the product cooled to room temperature, about 25° C. The resin will contain a plurality of reactive

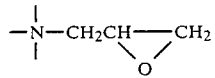

groups.

The resin is preferably stabilized against premature gelation by converting essentially all the reactive

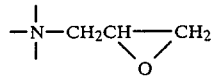

groups to inactive

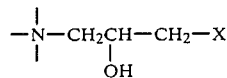

groups, X being the halogen of the epihalohydrin and chlorine when the epihalohydrin is epichlorohydrin.

The stabilization is accomplished by adding a water-soluble acid to the resin solution until essentially all the reactive groups are changed to the inactive form. This is accomplished by adding sufficient water-soluble acid to obtain and maintain a pH of from about 1 to 3. The reactive groups are thereby changed to the inactive form and the resin solution will be stabilized against gelation. When the pH remains at the desired pH for a period of about one hour at room temperature (about 25° C.) it is relatively certain that the pH will not change and the resin solution is stabilized against gelation. By this means, stable solutions having a resins solids content of from about 10% to about 50% can be prepared.

Acids that can be employed in the above stabilization procedure are water-soluble acids such as hydrochloric acid, hydrobromic acid, hydrofluoric acid, hydroiodic acid, sulfuric acid, nitric acid, phosphoric acid and acetic acid. Mixtures of two or more water-soluble acids can be used if desired.

Prior to use in the paper mill the stabilized resin is "reactivated" by adjusting the pH of the resin solution to and maintaining it above about 8, preferably 10.5 and higher. Preferred pH range is 10.5 to 11.7. This reconverts essentially all the inactive

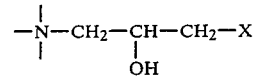

groups to the reactive cross-linking

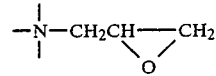

groups. This pH adjustment is made by the addition of a suitable organic or inorganic base such as the alkali metal hydroxides and carbonates, calcium hydroxide, benzyltrimethylammonium hydroxide, and tetramethylammonium hydroxide. The alkali metals include sodium, potassium, cesium and lithium. The base is added preferably as an aqueous solution.

The polyamide-epichlorohydrin resins, prepared as herein described, may be incorporated into pulp slurry at any point on the wet end of the paper machine. However, prior to use, the stabilized resin must be reactivated as above set forth to convert the halohydrin groups to epoxide groups.

The resins of this invention exhibit high "off-the-machine" wet strength and moderate to high dry strength. For most purposes, adequate wet strength can be obtained by incorporating in the paper from about 0.2% to about 3% of the resin based on the dry weight of the pulp.

The invention is further illustrated by the following examples which demonstrate the best known embodiments of the invention. In these examples, intrinsic viscosity (I.V.) measurements were determined at 25° C. on a 2% solution in 1M ammonium chloride and Brookfield viscosity measurements were determined at 25° C., using a #1 spindle at 60 r.p.m. unless otherwise indicated.

EXAMPLE 1

Part A-Methylbisaminopropylamine, 145.3 grams (1.0 mole) was charged to a resin kettle equipped with anchor stirrer, thermometer, heating mantle, nitrogen sparge and Dean-Stark water trap with condenser and the charge was heated to 130° C. Anhydrous oxalic acid, 90.0 grams (1.0 mole) in 270 ml of water was added as a slurry over a period of 15 minutes while keeping the temperature of the reaction mass below about 130° C. After the addition was complete the temperature of the reaction mass was raised to about 180°–190° C. and maintained at 180°–190° C. for 1.25 hours while the water was removed therefrom. A very viscous polyaminopolyamide resulted which was poured into an aluminum pan. The polyaminopolyamide had an I.V. of 0.105 at 25° C. and 1% concentration in m-cresol.

Part B—39.9 grams of the polyaminopolyamide of Part A, 98 ml of water, and 19.6 grams of 37.5% aqueous HCl were thoroughly admixed to provide a 30% aqueous solution of the resulting salt, the pH of the solution being about 2. A portion equal to 117.9 grams of the 30% aqueous solution (35.4 grams, 0.15 mole of resin solids) was placed into a reaction vessel and the pH of the solution was adjusted to 7.75 with 4 ml of 5 molar NaOH. Epichlorohydrin, 17.4 grams (0.188 mole) and then water, 36.6 ml were added to give 30% reaction solids. The temperature of the resulting solution which was at room temperature (about 25° C.), was raised to 50°–83° C. and the viscosity of the solution monitored. Periodic pH adjustments were made to maintain the pH at 7.1 to 8.0. When the Spence-Spurlin viscosity reached 25.9 seconds (4.7 hours), 316 ml of water were added and the pH was adjusted to 1.0 with 10 molar HCl. The resulting solution had a solids content of 10.0% by weight and a Brookfield viscosity of 20 cps.

EXAMPLE 2

A 50:50 by weight mixture of Rayonier bleached kraft pulp and Weyerhaeuser bleached hardwood kraft pulp was beaten to Canadian Standard freeness of 500 cc in a Noble and Wood cycle beater. The pulp was then adjusted to pH 7.5 with 10% NaOH and varying amounts, as specified in Table 1, based on the dry weight of pulp, of the polyaminopolyamide—epichlorohydrin resin prepared in Example 1, were added. The solution of Example 1 was reactivated for use by diluting 25 grams of the solution to about 3% solids with water, and adding, with mixing, 8.6 ml of 1N sodium hydroxide and 27.8 ml of water. The resulting solution had a resin solids content of about 2% and a pH of about 11.7. The pulp was sheeted on a Noble and Wood handsheet machine to provide handsheets having a basis weight of approximately 40 pounds per ream (3000 square feet) and the resulting handsheets were wet pressed to a 33% solids content and then dried at 105° C. for 45 seconds on a steam heated drum drier to 3–4% moisture. The dry strength was tested "uncured" (after 7 days of natural aging) or "cured" (after 30 minutes at 80° C.). The sheets tested for wet strength were soaked for two hours in distilled water. Results are listed in Table 1.

TABLE 1

| % of Resin Added | Basis Weight | Tensile Strength (lbs/inch) | | | |
|---|---|---|---|---|---|
| | | Dry | | Wet | |
| | | Uncured | Cured | Uncured | Cured |
| 0.25 | 39.7 | 20.6 | 21.9 | 3.03 | 3.53 |
| 0.50 | 39.6 | 20.9 | 22.3 | 4.03 | 4.47 |
| 0.75 | 39.6 | 23.5 | 23.3 | 4.29 | 5.06 |
| Blank | 40.0 | 17.3 | 17.7 | 0.60 | 0.60 |

EXAMPLE 3

Handsheets were prepared in accordance with the procedure of Example 2, using 0.9% resin based on the dry weight of the pulp. The handsheets gave a dry tensile of 21.7 (uncured) and 24.0 (cured) and a wet tensile of 4.28 (uncured) and 4.90 (cured) pounds per inch at a basis weight of 40.4 pounds per ream. Samples of the uncured handsheets were repulped in aqueous NaOH at a temperature of 85° C. Repulping of the paper sheets was carried out according to Tappi method 205 m-58 at a mixer speed of 2800 r.p.m., a pulp consistency of 1.3% and a pH of 12. The degree of repulping (fiber separation) was measured and reported in integers ranging from 1–6, the integer 6 indicating substantially complete repulping. After 10 minutes, the degree of repulping was measured at 5 and after 20 minutes there was substantially complete repulping.

EXAMPLE 4

Part A—Methylbisaminopropylamine, 145.3 grams (1.0 mole) was charged to a resin kettle equipped with anchor stirrer, thermometer, heating mantle, nitrogen sparge and Dean-Stark water trap with condenser and the charge was heated to 135° C. Oxalic acid, 45.0 grams (0.5 mole) was carefully added in small increments to keep the temperature of the reaction mass below 145° C. After the addition was complete (about 1 hour) the temperature of the reaction mass was raised to 177° to 181° C. and maintained thereat for about 1 hour until the water of polycondensation was removed. The temperature of the reaction mass was next reduced to 150° C. and dimethyl glutarate, 80.1 grams (0.5 mole) was added dropwise over a period of about 40 minutes. After the addition was complete, the temperature of the reaction mixture was raised to 175°–180° C. and maintained thereat for about 1 hour while the methanol was collected. A very viscous polyamino-copolyamide resulted which was poured into an aluminum pan. The polyamino-copolyamide had an I.V. of 0.140. Analysis of the product by nuclear magnetic resonance (NMR) indicated that 48 mole % of the product contained oxamidemoieties and 52 mole % glutaramide moieties.

Part B—22.04 grams (0.10 mole) of the polyamino-copolyamide of Part A, and 101 ml of water were placed in a reaction vessel, the pH being 8.15. Epichlorohydrin, 11.6 grams (0.125 mole) was added, giving 25% reaction solids and the temperature of the resulting solution was raised to 62°–65° C. and the viscosity of the solution was monitored. When the Spence-Spurlin viscosity reached 29 seconds, 178 ml of water were added and the pH was adjusted to 2 with 10 molar HCl. The temperature was maintained at 45°–47° C. and periodic pH adjustments were made until the pH of 2 was constant for about 1 hour. The resulting solution had a total solids content of 10.79% by weight and a Brookfield viscosity of 19 cps.

EXAMPLES 5 TO 7

The procedure of Example 4, parts A and B was repeated except that the amounts of oxalic acid and dimethylglutarate were varied. Details of these examples and properties of the polyamides and the resins therefrom are set forth in Table 2 below.

TABLE 2

| | Ex. 5 | Ex. 6 | Ex. 7 |
|---|---|---|---|
| Polyamino-copolyamide | | | |
| oxalic acid, mole | 0.4 | 0.3 | 0.2 |
| dimethylglutarate, mole | 0.6 | 0.7 | 0.8 |
| I.V. | 0.142 | 0.134 | 0.134 |
| Resin Solution | | | |
| Total Solids (%) | 10.88 | 10.67 | 10.65 |

TABLE 2-continued

|  | Ex. 5 | Ex. 6 | Ex. 7 |
|---|---|---|---|
| Brookfield viscosity, cps | 19 | 18.2 | 17.5 |

EXAMPLES 8 TO 11

The resin solutions of Examples 4 to 7 were activated for use using the procedure set forth in Example 2 and paper sheets were prepared using the resulting solutions and tested in accordance with the procedure of Example 2. Strength properties of the sheets are set forth in Table 3 below.

TABLE 3

| Ex. No. | Resin of | Addition % of Pulp | Basis Weight | Tensile Strength (lbs/inch) | | | |
|---|---|---|---|---|---|---|---|
|  |  |  |  | Dry | | Wet | |
|  |  |  |  | Uncured[1] | Cured | Uncured[1] | Cured |
| 8 | Ex. 4 | 0.25 | 39.8 | 21.4 | 20.3 | 3.54 | 4.27 |
|  |  | 0.50 | 39.8 | 23.4 | 24.5 | 4.88 | 5.86 |
|  |  | 0.75 | 40.0 | 22.2 | 22.6 | 5.01 | 5.64 |
| 9 | Ex. 5 | 0.25 | 39.9 | 20.3 | 23.3 | 3.81 | 4.14 |
|  |  | 0.50 | 40.1 | 22.4 | 21.9 | 4.62 | 5.36 |
|  |  | 0.75 | 39.7 | 22.1 | 22.6 | 5.03 | 5.67 |
| 10 | Ex. 6 | 0.25 | 39.5 | 20.6 | 21.0 | 3.36 | 3.85 |
|  |  | 0.50 | 40.3 | 21.3 | 22.3 | 4.58 | 5.36 |
|  |  | 0.75 | 40.5 | 23.8 | 25.3 | 5.74 | 6.45 |
| 11 | Ex. 7 | 0.25 | 40.2 | 22.9 | 24.0 | 3.72 | 4.27 |
|  |  | 0.50 | 40.0 | 21.3 | 23.1 | 4.94 | 5.46 |
|  |  | 0.75 | 39.9 | 22.7 | 22.8 | 5.22 | 5.95 |
| Blank | — | — | 40.0 | 18.1 | 19.9 | 0.59 | 0.63 |

[1]after 8 days of natural aging.

EXAMPLES 12 TO 15

Paper sheets were prepared in accordance with the method of Example 2 using an amount (based on dry pulp) of the resins of Examples 4 to 7 to provide uncured sheets of substantially equivalent wet strength. The strength properties of these sheets are set forth in Table 4.

TABLE 4

| Ex. No. | Resin of | % Resin Added | Basis Weight | Tensile Strength (lbs/inch) | | | |
|---|---|---|---|---|---|---|---|
|  |  |  |  | Dry | | Wet | |
|  |  |  |  | Uncured[1] | Cured | Uncured[1] | Cured |
| 12 | Ex. 4 | 0.50 | 39.6 | 20.7 | 20.4 | 3.10 | 3.62 |
| 13 | Ex. 5 | 0.75 | 39.6 | 20.2 | 21.3 | 3.48 | 3.78 |
| 14 | Ex. 6 | 0.55 | 39.3 | 18.6 | 19.5 | 2.91 | 3.27 |
| 15 | Ex. 7 | 0.75 | 40.3 | 21.2 | 20.7 | 3.65 | 4.10 |

[1]after 4 days of natural aging.

The paper sheets were repulped in aqueous NaOH at a pH of 12 and a temperature of 85°° C. The degree of repulping was measured at 5 and 10 minutes and then every 10 minutes up to a total of 1 hour (or until stage 6, essentially complete fiber separation was reached) using the method set forth in Example 3. Test results are set forth in Table 5 below.

TABLE 5

| Example No. | Degree of Repulping (After Minutes) | | | | | |
|---|---|---|---|---|---|---|
|  | 5 | 10 | 20 | 30 | 40 | 50 |
| 12 | 1 | 3 | 5 | 6 |  |  |
| 13 | <1 | 3 | 5 | 6 |  |  |
| 14 | 2 | 5 | 6 |  |  |  |
| 15 | <1 | <1 | 4 | 4 | 5 | 6 |

EXAMPLE 16

Part A—Methylbisaminopropylamine, 145.3 grams (1.0 mole) was charged to a resin kettle equipped with anchor stirrer, thermometer, heating mantle, nitrogen sparge and Dean-Stark water trap with condenser and the charge was heated to 133° C. Oxalic acid, 63.0 grams (0.7 mole) was added as a solid in small increments to keep the temperature below 145° C. After the addition was complete, the temperature was raised to 184°-191° C. and was maintained thereat until the water of polycondensation was removed. The temperature of the reaction mass was next reduced to 150° C. and dimethyl glutarate, 48.1 grams (0.3 mole) was added over a period of about 1 hour. The temperature was then raised and maintained at 173°-179° C. while the methanol was collected. The resulting, very viscous polyamino-copolyamide was poured into an aluminum pan. The product had an I.V. of 0.104 and contained, by NMR analyses 31 mole % glutaramide moieties and 69 mole % oxamide moieties.

Part B—42.46 grams of the polyamino-copolyamide of Part A, 103.6 ml of water and 19.6 grams of 37.5% aqueous HCl were thoroughly mixed to provide a 30.6% aqueous solution of the resulting salt, the pH of the solution being 4.8. A portion equal to 81.39 grams of the aqueous solution (24.9 grams, 0.1 mole) was placed in a reaction vessel and the pH of the solution was adjusted to 8.0 with 8 ml of 5 molar NaOH. Epichlorohydrin, 11.6 grams (0.125 mole) and 45 ml of water were added to give 25% reaction solids. The temperature of the resulting solution was raised to 69°-75° C. and the viscosity of the solution monitored. When the Spence-Spurlin viscosity reached 24.6 seconds, 196 ml of water were added and the pH was adjusted to 1.6 with 10 molar HCl. The temperature of the solution was maintained at 42°-44° C. and periodic pH adjustments were made until the pH was constant for about 1 hour. The resulting solution had a solids content of 10.3% by weight and a Brookfield viscosity of 21 cps.

EXAMPLES 17 TO 18

The procedure of Example 16, Parts A & B was repeated except that the amounts of oxalic acid and dimethyl glutarate were varied. Details of these examples and properties of the polyamides and the resins therefrom are set forth in Table 6 below.

TABLE 6

|  | Ex. 17 | Ex. 18 |
|---|---|---|
| Polyamino-copolyamide |  |  |
| Oxalic acid, mole | 0.80 | 0.90 |
| Dimethyl glutarate, mole | 0.20 | 0.10 |
| I.V. | 0.099 | 0.087 |
| Resin Solution |  |  |
| Total Resin Solids, % | 9.51 | 9.7 |
| Brookfield viscosity, cps | 16.5 | 19 |

EXAMPLES 19 TO 21

The resin solutions of Examples 16 to 18 were activated for use using the procedure set forth in Example 2 and paper sheets were prepared using the resulting solutions and tested in accordance with the procedure of Example 2. Strength properties of the sheets are set forth in Table 7 below.

TABLE 7

| Ex. No. | Resin of | Addition % of Pulp | Basis Weight | Tensile Strength (lbs/inch) | | | |
|---|---|---|---|---|---|---|---|
| | | | | Dry | | Wet | |
| | | | | Uncured | Cured | Uncured | Cured |
| 19 | Ex. 16 | 0.25 | 39.4 | 21.0 | 22.2 | 2.94 | 3.86 |
| | | 0.50 | 40.1 | 22.1 | 23.4 | 3.99 | 4.83 |
| | | 0.75 | 39.5 | 21.5 | 22.0 | 4.53 | 5.16 |
| 20 | Ex. 17 | 0.25 | 40.0 | 21.1 | 21.2 | 2.78 | 3.28 |
| | | 0.50 | 39.4 | 20.9 | 20.6 | 3.45 | 4.08 |
| | | 0.75 | 39.7 | 22.6 | 23.4 | 4.20 | 5.07 |
| 21 | Ex. 18 | 0.25 | 39.3 | 22.4 | 21.9 | 3.52 | 3.86 |
| | | 0.50 | 39.4 | 21.9 | 22.6 | 4.33 | 4.83 |
| | | 0.75 | 39.8 | 22.0 | 23.0 | 4.80 | 5.45 |
| Blank | — | | 40.0 | 17.3 | 17.7 | 0.60 | 0.60 |

EXAMPLES 22 TO 24

Paper sheets were prepared in accordance with the method of Example 2 using an amount (based on dry pulp) of the resins of Examples 16 to 18 provide uncured sheets of substantially equivalent wet strength. The strength properties of these sheets are set forth in Table 8.

TABLE 8

| Ex. No. | Resin of | % Resin Added | Basis Weight | Tensile Strength (lbs/inch) | | | |
|---|---|---|---|---|---|---|---|
| | | | | Dry | | Wet | |
| | | | | Uncured | Cured | Uncured | Cured |
| 22 | Ex. 16 | 0.80 | 40.1 | 21.0 | 22.9 | 4.28 | 4.91 |
| 23 | Ex. 17 | 0.90 | 40.3 | 21.0 | 22.9 | 4.25 | 4.98 |
| 24 | Ex. 18 | 0.75 | 40.5 | 20.9 | 23.6 | 3.93 | 4.68 |
| Blank | — | | 39.6 | 20.6 | 19.7 | 0.59 | 0.63 |

The paper sheets were repulped in aqueous NaOH at a pH of 12 and a temperature of 85° C. The degree of repulping was measured in the manner of Examples 12 to 15 and the results are set forth in Table 9.

TABLE 9

| Example No. | Degree of Repulping (After Minutes) | | |
|---|---|---|---|
| | 5 | 10 | 20 |
| 22 | 2 | 4 | 6 |
| 23 | 2 | 4 | 6 |
| 24 | 2 | 4 | 6 |

EXAMPLE 25

Part A—Methylbisaminopropylamine, 145.3 grams (1.0 mole) was charged to the kettle of Example 1 and heated to 105° C. Oxalic acid dihydrate, 88.25 grams (0.7 mole) was dissolved in 228 ml of water at 45° C. and the oxalic acid solution was added dropwise to the kettle over a period of 35 minutes while maintaining the contents at 105°-110° C. After completion of the addition, the temperature was raised to 186° C. and maintained thereat until the water was removed (about 4-5 hours). The temperature of the reaction mass was next decreased to 150° C. and 48.05 grams (0.3 mole) of dimethyl glutarate were added dropwise over 9 minutes. The temperature of the mixture was raised to 184° C. and maintained thereat for 1 hour while the methanol was removed. The resulting polyamide was recovered by pouring into a pan and had an I.V. of 0.104 (determined as the hydrochloride salt).

Part B—21.2 grams of the polyamino-copolyamide of Part A, 51.8 ml of water and 9.8 grams of 37.5% aqueous HCl were thoroughly mixed to provide a 30.62% aqueous solution of the resulting salt, the pH of the solution being 6.1. A portion of the solution equal to 72.96 grams (0.09 mole) was placed in a reaction vessel and the pH was adjusted to 8.2 with 4.6 ml of 5 molar NaOH. Epichlorohydrin, 10.43 grams (0.112 mole) and then 43 ml of water were added to give 25% reaction solids. The temperature of the mixture was raised to 70°-80° C. and the viscosity of the solution was monitored. When the Spence-Spurlin viscosity reached 22.8 seconds, 176 ml of water were added and the pH was adjusted to 1.7 with 10 molar HCl. The temperature of the solution was maintained at 43°-45° C. and periodic pH adjustments were made until the pH was constant for about 1 hour. The resulting solution had a solids content of 10.2% by weight and a Brookfield viscosity of 20.5 cps.

EXAMPLE 26

Part A—The general procedure of Example 25 Part A was repeated except that the oxalic acid dihydrate was dissolved in 161 ml of water at 60° C. and, following removal of methanol, the temperature of the product was decreased to 115° C. and 314 ml of hot water (70°-75° C.) and 51.2 grams of 37.5% HCl were added dropwise over 15 minutes to give a clear orange solution of pH 7.4 and a total solids of 41.8%. The resulting polyamino-copolyamide had an I.V. of 0.100.

Part B—A portion of the solution of Part A equal to 82.37 grams and 107.5 ml of water were placed in a reaction vessel, the pH being 8.5. Epichlorohydrin, 17.4 grams, was added and the temperature was raised to 64°-72° C. When the Spence-Spurlin viscosity reached 30 seconds, 276 ml of water was added and the pH was adjusted to 2.0 with 10 molar HCl. The temperature was maintained at 40°-45° C. and periodic pH adjustments were made until the pH was constant for about 1 hour. The resulting solution had a solids content of 10.98% and a Brookfield viscosity of 23.4 cps.

EXAMPLES 27-28

The resin solutions of Examples 25 and 26 were activated for use using the procedure set forth in Example 2 and paper sheets were prepared using the resulting solutions and tested in accordance with the procedure of Example 2. Strength properties of the sheets are set forth in Table 10 below.

TABLE 10

| Ex. No. | Resin of | Addition % of Pulp | Basis Weight | Tensile Strength (lbs/inch) | | | |
|---|---|---|---|---|---|---|---|
| | | | | Dry | | Wet | |
| | | | | Uncured | Cured | Uncured | Cured |
| 27 | Ex. 25 | 0.25 | 40.7 | 21.9 | 22.4 | 3.13 | 3.31 |
| | | 0.50 | 40.0 | 21.9 | 21.1 | 3.49 | 3.86 |
| | | 0.75 | 40.8 | 22.7 | 21.7 | 4.14 | 4.78 |
| Blank | — | | 39.6 | 18.5 | 17.8 | 0.57 | 0.57 |
| 28 | Ex. 26 | 0.25 | 39.6 | 18.7 | 18.7 | 2.63 | 3.16 |
| | | 0.50 | 39.5 | 20.6 | 19.8 | 3.32 | 3.80 |
| | | 0.75 | 39.3 | 20.6 | 20.2 | 3.94 | 4.49 |
| Blank | — | | 39.8 | 19.1 | 18.2 | 0.59 | 0.67 |

EXAMPLE 29

Example 28 was repeated except that Chesapeake unbleached kraft pulp was substituted for the mixture of bleached kraft pulp of Example 2. The strength properties of the sheets are tabulated below in Table 11.

TABLE 11

| % of Resin Added | Basis Weight | Tensile Strength (lbs/inch) | | | |
|---|---|---|---|---|---|
| | | Dry | | Wet | |
| | | Uncured | Cured | Uncured | Cured |
| 0.25 | 41.3 | 27.2 | 26.6 | 3.84 | 4.14 |
| 0.50 | 40.6 | 26.8 | 27.0 | 5.29 | 5.65 |
| 0.75 | 41.3 | 26.4 | 26.7 | 5.85 | 6.68 |
| Blank | 40.5 | 20.0 | 19.8 | 0.66 | 0.76 |

What I claim and desire to protect by Letters Patent is:

1. A paper product having wet and dry strength and improved repulpability comprising sheeted cellulose fibers treated with from about 0.2 to about 3% by weight, based on dry weight of fibers, of a water-soluble, cationic thermosetting resin derived by reacting N-bis(aminopropyl)-methylamine saturated dicarboxylic acid component comprising oxalic acid to form a polyaminopolyamide containing tertiary amine groups, the mole ratio of N-bis(aminopropyl)-methylamine to the acid component being from about 0.9:1 to about 1.2:1 and then reacting the polyaminopolyamide, in aqueous solution with from about 1 mole to about 1.5 moles of epihalohydrin per mole of tertiary amine groups present in said polyaminopolyamide.

2. The paper product of claim 1 wherein the epihalohydrin is epichlorohydrin.

3. The paper product of claim 2 wherein the acid component is oxalic acid.

4. The paper product of claim 1 wherein the acid component also contains a diester of adipic acid or glutaric acid.

* * * * *